(12) United States Patent
Hong et al.

(10) Patent No.: US 9,318,763 B2
(45) Date of Patent: Apr. 19, 2016

(54) CERAMIC POROUS SUBSTRATE, REINFORCED COMPOSITE ELECTROLYTE MEMBRANE USING THE SAME AND MEMBRANE-ELECTRODE ASSEMBLY HAVING THE SAME

(75) Inventors: Young Talk Hong, Daejeon (KR); Jong Ho Choi, Daejeon (KR); Kyung Seok Yoon, Daejeon (KR); Sang Young Lee, Gangwon-do (KR)

(73) Assignee: Korea Research Institute of Chemical Technology (KR)

( * ) Notice: Subject to any disclaimer, the term of this patent is extended or adjusted under 35 U.S.C. 154(b) by 1173 days.

(21) Appl. No.: 13/375,961

(22) PCT Filed: Jun. 26, 2009

(86) PCT No.: PCT/KR2009/003465
§ 371 (c)(1),
(2), (4) Date: Dec. 2, 2011

(87) PCT Pub. No.: WO2010/140733
PCT Pub. Date: Dec. 9, 2010

(65) Prior Publication Data
US 2012/0077109 A1    Mar. 29, 2012

(30) Foreign Application Priority Data

Jun. 4, 2009    (KR) .................. 10-2009-0049524

(51) Int. Cl.
| H01M 8/02 | (2006.01) |
| H01M 8/10 | (2006.01) |
| C08J 5/22 | (2006.01) |
| H01M 4/90 | (2006.01) |
| H01M 4/92 | (2006.01) |

(52) U.S. Cl.
CPC ............... *H01M 8/1011* (2013.01); *C08J 5/22* (2013.01); *H01M 4/9075* (2013.01); *H01M 4/925* (2013.01); *H01M 8/106* (2013.01); *H01M 8/1039* (2013.01); *H01M 8/1051* (2013.01); *C08J 2383/02* (2013.01); *Y02E 60/523* (2013.01); *Y10T 428/24997* (2015.04); *Y10T 428/249967* (2015.04); *Y10T 428/249969* (2015.04); *Y10T 442/2139* (2015.04)

(58) Field of Classification Search
CPC ....................................................... H01M 8/02
See application file for complete search history.

(56) References Cited

U.S. PATENT DOCUMENTS

| 5,438,082 | A | 8/1995 | Helmer-Metzmann et al. |
| 2,455,881 | A1 | 6/2001 | Faure et al. |
| 7,883,820 | B2 * | 2/2011 | Chang et al. .................. 429/492 |
| 2003/0113611 | A1 * | 6/2003 | Abe et al. ........................ 429/43 |
| 2004/0241520 | A1 * | 12/2004 | Ha et al. .......................... 429/33 |
| 2008/0241629 | A1 * | 10/2008 | Peled et al. ..................... 429/33 |
| 2008/0245735 | A1 * | 10/2008 | Hennige .............. B01D 53/228 210/650 |
| 2009/0311578 | A1 * | 12/2009 | Koji et al. ....................... 429/42 |

FOREIGN PATENT DOCUMENTS

| JP | H06-093114 | 4/1994 |
| JP | 2006140098 A | 6/2006 |
| KR | 1020010091642 A | 10/2001 |
| KR | 1020050056892 A | 6/2005 |
| WO | 2010140733 A1 | 12/2010 |

OTHER PUBLICATIONS ("Performance evaluation of a Nafion/silicon oxide hybrid membrane for direct methanol fuel cell" D.H. Jung et al., Journal of Power Sources vol. 106, Issues 1-2, pp. 173-177, 2002.*
H. Tang et al. Fabrication and characterization of improved PFSA/ePTFE composite polymer electrolyte membranes. Journal of Membrane Science (2007) 306, 298-306, ScienceDirect, doi:10.1016/j.memsci.2007.09.008.
H. Tang et al. Fabrication and characterization of PFSI/ePTFE composite proton exchange membranes of polymer electrolyte fuel cells. Electrochimica Acta (2007) 52, 5304-5311, ScienceDirect, doi:10.1016/j.electacta.2007.02/031.
X. Zhu et al. Challenging reinforced composite polymer electrolyte membranes based on disulfonated poly(arylene ether sulfone)-impregnated expanded PTFE for fuel cell applications. Journal of Materials Chemistry (2007) 4, 386-397, The Royal Society of Chemistry, doi:10.1039/B611690F.
R. Nolte et al. Partially sulfonated poly (arylene ether sulfone)—A versatile proton conducting membrane material for modern energy conversion technologies. Journal of Membrane Science (1993) 83, 211-220, Elsevier Science Publishers.

* cited by examiner

*Primary Examiner* — Jacob Marks
(74) *Attorney, Agent, or Firm* — Levenfeld Pearlstein, LLC

(57) ABSTRACT

The present invention relates to a ceramic porous substrate, a reinforced composite electrolyte membrane using the same, and a membrane-electrode assembly having the same. The ceramic porous substrate comprises: a porous polymer base; and void structures formed on the surface of the porous polymer base by linking the space of the inorganic nanoparticles using a polymer binder or a silane-based inorganic binder. The ceramic porous substrate has improved mechanical properties compared to the porous polymer substrate alone, and the void structures thereof can be controlled in various ways.

3 Claims, 6 Drawing Sheets

CERAMIC POROUS SUBSTRATE, REINFORCED COMPOSITE ELECTROLYTE MEMBRANE USING THE SAME AND MEMBRANE-ELECTRODE ASSEMBLY HAVING THE SAME

CROSS-REFERENCE TO RELATED APPLICATIONS

This is a National Stage Application of International Patent Application No. PCT/KR2009/003465, filed Jun. 26, 2009, which claims the benefit of and priority to Korean Patent Application No. 10-2009-0049524, filed Jun. 4, 2009, the contents of each of which are incorporated fully by reference herein.

TECHNICAL FIELD

The present invention relates to a ceramic porous substrate, a reinforced composite electrolyte membrane using the same, and a membrane-electrode assembly having the same. More specifically, the present invention relates to a substrate which have improved mechanical properties and dimensional stability compared to conventional porous polymer bases, and the void structure of which can be controlled in various ways, and to a reinforced composite electrolyte membrane using the ceramic porous substrate and a membrane-electrode assembly having the reinforced composite electrolyte membrane.

BACKGROUND ART

Fuel cells need not to be exchanged or charged, unlike general-purpose cells, and are power-generation cells that convert chemical energy into electrical energy using a fuel such as hydrogen or methanol.

Also, the fuels cells are high-efficiency power generation systems having an energy conversion efficiency of about 60% and their fuel consumption is lower than conventional internal combustion engines due to their high efficiency. In addition, they are nonpolluting energy sources that do not generate environmental pollutants such as SOx, NOx, VOC, etc. In addition, these fuel cells have advantages in that they can use various fuels and require a small area and a short construction period.

Due to these advantages, the fuel cells are used in various applications, including mobile power sources such as portable devices, transportable power sources such as automobiles, distributed power generation systems which can be used for home and power business applications, etc. Particularly, it is expected that, if fuel cell automobiles that are next-generation transportation systems are put to practical use, the potential market size of the fuel cells will be enormous.

Fuel cells are largely classified, according to operating temperature and electrolyte, into alkali fuel cells (AFCs), phosphoric acid fuel cells (PAFCs), molten-carbonate fuel cells (MCFCs), solid oxide fuel cells (SOFCs), polymer electrolyte membrane fuel cells (PEMFCs) and direct methanol fuel cells (DMFCs).

Among them, the polymer electrolyte membrane fuel cell and the direct methanol fuel cell, which have excellent mobility, are receiving a great deal of attention as next-generation power sources.

An electrolyte membrane that is the key element of the polymer electrolyte membrane fuel cell and the direct methanol fuel cell should function not only to transfer hydrogen ions, but also to prevent fuel from moving from a positive electrode to a negative electrode. Thus, the electrolyte membrane acts as a cation exchange membrane and should have hydrogen ion conductivity and, at the same time, chemical, thermal, mechanical and electrochemical stabilities.

Typical examples of ion conductive polymer electrolyte membranes include Nafion, a perfluorinated hydrogen-ion exchange membrane developed by DuPont (USA) in the early 1960s. In addition, commercial perfluorinated polymer electrolyte membranes similar to Nafion include Aciplex-S membrane (Asahi Chemicals), Dow membrane (Dow Chemicals), Flemion membrane (Asahi Glass), etc.

Although the commercial perfluorinated polymer electrolyte membranes have chemical resistance, oxidation resistance and excellent ion conductivity, they are expensive and the toxicity of intermediate products occurring during the manufacture of the membrane causes environmental problems.

In order to overcome the drawbacks of such perfluorinated polymer electrolyte membranes, polymer electrolyte membranes comprising aromatic polymers having a carboxyl group, a sulfonic acid group or the like introduced therein have been studied. Examples thereof include sulfonated polyarylether sulfones [*Journal of Membrane Science,* 1993, 83, 211], sulfonated polyether ketones [Japanese Patent Laid-Open Publication No. Hei 6-93114, and U.S. Pat. No. 5,438,082], sulfonated polyimides [U.S. Pat. No. 6,245,881], etc.

However, such polymer electric membranes have problems in that a dehydration reaction is likely to occur by an acid or heat in the process of introducing a sulfonic acid group onto the aromatic ring and in that the hydrogen ion conductivity of the membrane is greatly influenced by water molecules.

The above-mentioned perfluorinated and hydrocarbon-based polymer electrolyte membranes show a rapid decrease in ion conductivity due to a decrease in water content at a temperature higher than 100° C., become soft above 100° C. and have high methanol permeability. Due to such problems, the polymer electrolyte membranes are very difficult to commercialize.

In an attempt to overcome such problems, studies on reinforced composite electrolyte membranes are being actively conducted in many companies. For example, Gore Select® membranes are currently commercially available from W. L. Gore & Associates, Inc (USA).

The performance of the reinforced composite electrolyte membranes is determined according to the chemical structure, pore size, porosity and mechanical properties of a porous substrate employed to impart mechanical properties and dimensional stability to the membrane.

Thus, in order to satisfy the requirement of the high ion conductivity of the reinforced composite electrolyte membrane, the porous substrate is required to have a high porosity of 50% or higher.

However, if the porous substrate has high porosity, the mechanical properties of the membrane will be reduced. Accordingly, there is an urgent need to develop a porous substrate satisfying all the requirements of high porosity and excellent mechanical properties.

Meanwhile, polytetrafluoroethylene or polyethylene porous substrates which are in common use are hydrophobic in nature, and thus have low miscibility with hydrogen ion conducting electrolytes, so that the electrolyte is difficult to impregnate into the porous substrate and the interfacial adhesion therebetween is reduced.

In an attempt to solve this problem, studies on making polytetrafluoroethylene hydrophilic by surface modification have been reported [*Electrochimica Acta,* 2007, 52, 5304, *J. Materials Chemistry,* 2007, 4, 386, *J. Membrane Science,* 2007, 306, 298].

However, although this technology provides some improvement in the hydrophilicity of the membrane, it does not provide a fundamental improvement in the hydrophilicity due to the property of the material of the membrane. For this reason, post-treatment processes such as plasma treatment are applied. This post-treatment process causes damage to the porous substrate and makes the manufacture process complex. Accordingly, there is a need to develop a new conceptual porous substrate which is completely different from conventional porous substrates.

DISCLOSURE

Technical Problem

It is an object of the present invention to provide a ceramic porous substrate for fuel cell electrolyte membranes, which satisfies both high porosity and excellent mechanical properties.

Another object of the present invention is to provide a reinforced composite electrolyte membrane wherein a hydrogen ion conductive polymer electrolyte for polymer electrolyte fuel cells or direct methanol fuel cells is impregnated in said ceramic porous substrate, and a manufacturing method thereof.

Still another object of the present invention is to provide a membrane-electrode assembly comprising said reinforced composite electrolyte membrane having improved physical properties.

Technical Solution

To achieve the above objects, the present invention provides a ceramic porous substrate for fuel cell electrolyte membranes, which comprises: a porous polymer base; and void structures formed on the surface of the porous polymer base by linking the space of the inorganic nanoparticles using a polymer binder or a silane-based inorganic binder.

The present invention also provides a ceramic porous substrate for fuel cell electrolyte membranes, which comprises: a porous polymer base; and void structures formed by a silane-based inorganic binder on the surface of the porous polymer base.

The porous polymer base that is used in the ceramic porous substrate for fuel cell electrolyte membranes according to the present invention is preferably made of one or a mixture of two or more selected from the group consisting of polyethylene, polypropylene, polyester, polyamide, cellulose, polysulfone, polyethersulfone, and polyamide.

The porous polymer base has a pore size of 0.001-100 μm and is any one selected from membranes, woven fabrics and non-woven fabrics, which have a thickness of 1-1000 μm.

Also, the inorganic nanoparticles that are used in the ceramic porous substrate for fuel cell electrolyte membranes according to the present invention have a particle size of 0.001-100 μm and are made of one or a mixture of two or more selected from the group consisting of $SiO_2$, $TiO_2$, $Al_2O_3$, $ZrO_2$ and $BaTiO_3$.

The silane-based inorganic binder that is used in the ceramic porous substrate according to the present invention is preferably a silane-based material prepared by a sol-gel reaction and is made of one or a mixture of two or more selected from the group consisting of tetraethoxysilane, aminopropyltriethoxysilane, glycidyloxytrimethoxysilane, and vinyltriethoxysilane. Also, the polymer binder that is used in the ceramic porous substrate according to the present invention is preferably one or a mixture of two or more selected from the group consisting of polyvinylidene fluoride, polymethylmethacrylate, polyacrylonitrile, polytetrafluoroethylene, polyimide, and stylene-butadiene rubber.

In the present invention, the ceramic porous substrate has a pore size of 0.001-50 μm, a porosity of 5-99% and a thickness of 1-1000 μm.

The present invention also provides a reinforced composite electrolyte membrane comprising: said ceramic porous substrate; a hydrogen ion conductive polymer electrolyte for polymer electrolyte fuel cells or direct methanol fuel cells, is impregnated in the void structure of the ceramic porous substrate. Herein, the hydrogen ion conductive polymer electrolyte is made either of a hydrogen ion conductive polymer or is uniformed mixed of 1-99.999 wt % of the hydrogen ion conductive polymer and 0.001-10 wt % of one or a mixture of two or more selected from the group consisting of $SiO_2$, $TiO_2$, $Al_2O_3$, $ZrO_2$ and $BaTiO_3$.

Thus, the reinforced composite electrolyte membrane according to the present invention shows improved physical properties when it is used as a fuel cell electrolyte membrane. Particularly, it shows a change in area of 10% or less between before and after impregnation with water at a temperature of 25° C. or above.

The present invention also provides a method for manufacturing a reinforced composite electrolyte membrane. More specifically, the manufacturing method comprises: 1) preparing of the mixture solution containing 10-99 wt % of inorganic nanoparticles and 1-90 wt % of a polymer binder or a silane-based inorganic binder in a solvent;

2) coating a porous polymer base with the mixture solution to prepare a film-shaped ceramic porous substrate, and drying the ceramic porous substrate;

3) impregnating the ceramic porous substrate with a hydrogen ion conductive polymer electrolyte for polymer electrolyte fuel cells or direct methanol fuel cells, and drying the impregnated ceramic porous substrate to prepare a reinforced composite electrolyte membrane; and 4) sulfonating the reinforced composite electrolyte membrane using a sulfuric acid solution.

Further, the present invention provides a membrane-electrode assembly comprising said reinforced composite electrolyte membrane as an electrolyte membrane for polymer electrolyte fuel cells or direct methanol fuel cells.

Advantageous Effects

The present invention can provide a ceramic porous substrate which satisfies both high porosity and excellent mechanical properties and has excellent dimensional stability. Also, the present invention can provide a reinforced composite electrolyte membrane by impregnating a hydrogen ion conductive polymer electrolyte into the ceramic porous substrate.

The reinforced composite electrolyte membrane of the present invention has improved mechanical properties and dimensional stability, and the ion conductivity thereof can be optimized by controlling the void structure of the substrate.

The reinforced composite electrolyte membrane according to the present invention has excellent transport properties, such as high hydrogen ion conductivity and low methanol crossover, low water uptake rate at high temperature, and high dimensional stability, which are required for fuel cell membranes. Thus, a membrane-electrode assembly comprising the reinforced composite electrolyte membrane of the present invention will have improved performance.

BEST MODE

Hereinafter, the present invention will be described in detail.

The present invention provides a porous substrate for fuel cell electrolyte membranes, which satisfies high porosity and excellent mechanical properties at the same time.

In the porous substrate of the present invention, inorganic nanoparticles are bound to a porous polymer base by a silane-based inorganic binder so as to provide interstitial pores between the nanoparticles. Thus, the porous substrate of the present invention has improved mechanical properties compared to the porous polymer base alone, and the pore size, porosity and void structure of the porous substrate can be controlled.

In a first preferred embodiment, the present invention provides a ceramic porous substrate for fuel cell electrolyte membranes, which comprises: a porous polymer base; and void structures formed on the surface of the porous polymer base by linking the space of the inorganic nanoparticles using a polymer binder or a silane-based inorganic binder.

The inorganic nanoparticles that are used in the ceramic porous substrate of the first embodiment may be made of any material having a particle size of 0.001-100 μm. Preferably, the inorganic nanoparticles are made of an inorganic oxide-based material, and more preferably one or a mixture of two or more selected from the group consisting of $SiO_2$, $TiO_2$, $Al_2O_3$, $ZrO_2$ and $BaTiO_3$.

The porous polymer base that is used in the ceramic porous substrate of the first embodiment is made of one or a mixture of two or more selected from the group consisting of polyethylene, polypropylene, polyester, polyamide, cellulose, polysulfone, polyethersulfone, and polyamide. Herein, the porous polymer base has a pore size of 0.001-100 μm and is any one selected from membranes, woven fabrics and non-woven fabrics, which have a thickness of 1-1000 μm.

Also, the polymer binder that is used in the ceramic porous substrate of the present invention is preferably made of one or a mixture of two or more selected from the group consisting of polyvinylidene fluoride, polymethylmethacrylate, polyacrylonitrile, polytetrafluoroethylene, and polyimide, styrene-butadiene rubber.

The silane-based inorganic binder that is used in the ceramic porous substrate according to the present invention may be a silane-based material prepared by a sol-gel reaction. Preferably, the silane-based inorganic binder may be made of one or a mixture of two or more selected from the group consisting of tetraethoxysilane (TEOS), aminopropyltriethoxysilane (AMEO), glycidyloxytrimethoxysilane (GLYMO), and vinyltriethoxysilane (VTEO).

Figure 1:
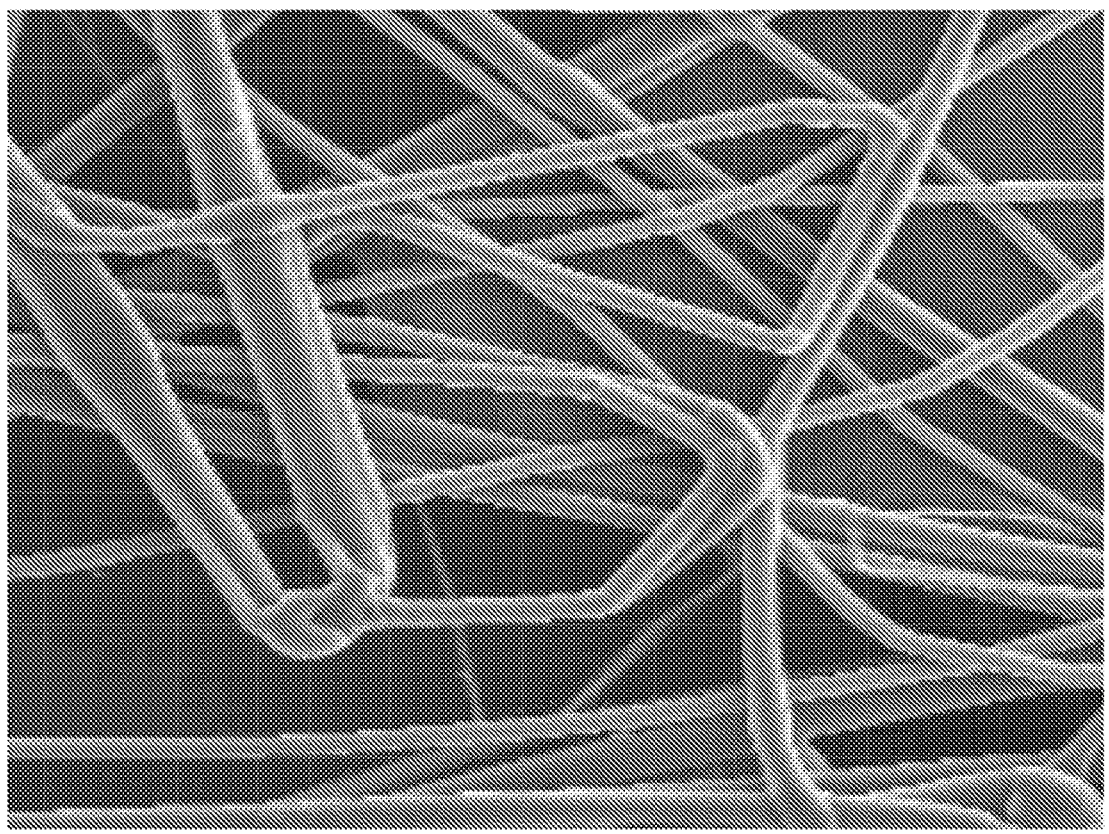
FIG. 1 is a field effect scanning electron micrograph (FE-SEM) of a polyethylene terephthalate (PET) non-woven fabric used in a porous polymer base in the present invention.
Figure 2:
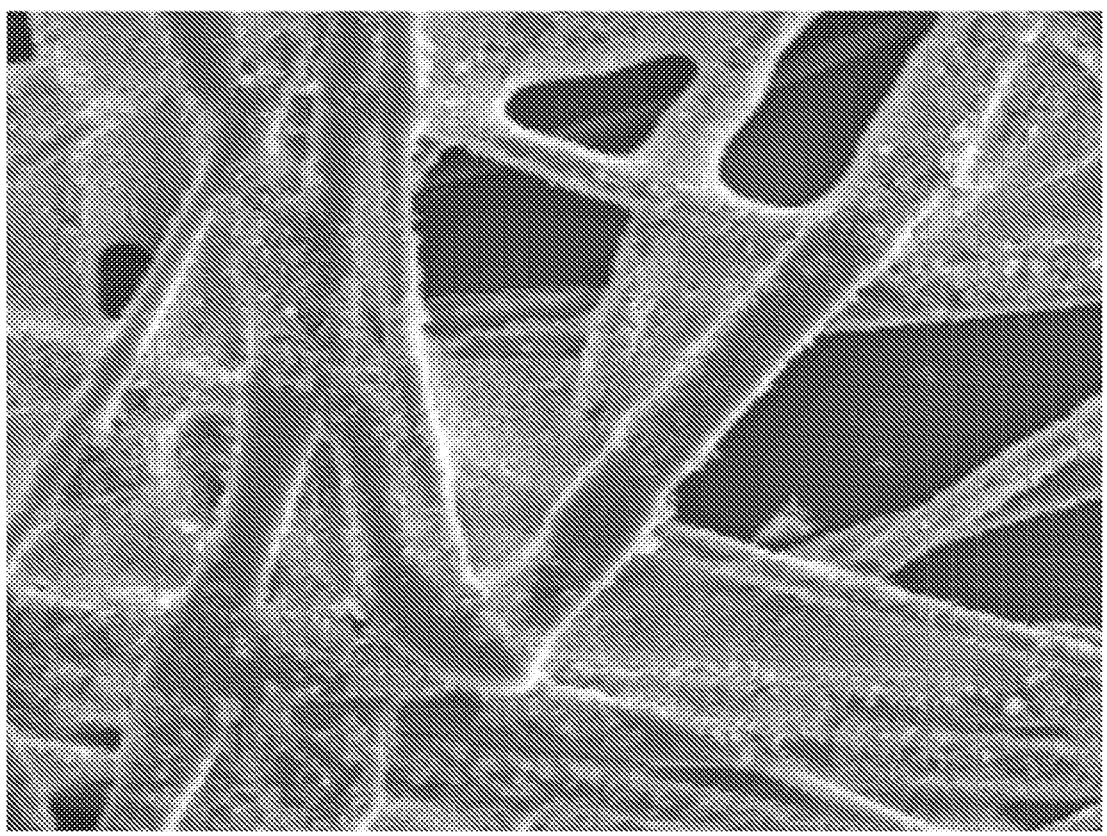
FIG. 2 is a field effect scanning electron micrograph (FE-SEM) of a ceramic porous substrate prepared by introducing a mixture solution of inorganic nanoparticles and a silane-based inorganic binder into the PET nonwoven fabric of FIG. 1.

FIG. 1 is a scanning electron micrograph of a polyethylene terephthalate (PET) non-woven fabric used in a porous polymer base in the present invention, and FIG. 2 is a scanning electron micrograph of the ceramic porous substrate of the present invention, prepared by introducing a mixture solution of inorganic nanoparticles and a silane-based inorganic binder into the PET nonwoven fabric. As can be seen in FIGS. 1 and 2, in the ceramic porous substrate of the present invention, the inorganic nanoparticles are bound to the PET non-woven fabric by the binder and are distributed uniformly on the PET nonwoven fabric, and interstitial pores are formed between the inorganic nanoparticles.

In a second preferred embodiment, the present invention provides a ceramic porous substrate for fuel cell electrolyte membranes, which comprises: a porous polymer base; and void structures formed by a silane-based inorganic binder on the surface of the porous polymer base.

The silane-based inorganic binder used in the second embodiment is the same as used in the first embodiment.

The ceramic porous substrate according to the first or second embodiment of the present invention has a pore size of 0.001-50 μm. If the pore size of the ceramic porous substrate is less than 0.001 μm, an electrolyte will be difficult to impregnate into the pores, and if the pore size is more than 50 μm, the porosity of the substrate will decrease and the durability thereof will also decrease.

Also, the ceramic porous substrate of the present invention has a porosity of 5-99% and a thickness of 1-1000 μm.

The present invention also provides a reinforced composite electrolyte membrane comprising: the ceramic porous substrate of the first or second embodiment; and a hydrogen ion conductive polymer electrolyte for polymer electrolyte fuel cells or direct methanol fuel cells impregnated into the pores of the ceramic porous substrate.

In the reinforced composite electrolyte membrane, the hydrogen ion conductive polymer electrolyte may be any electrolyte that is used for polymer electrolyte fuel cells or direct methanol fuel cells, including commercially available products such as Nafion. Typical examples thereof include those containing a perfluorinated polymer, a hydrocarbon-based polymer, or a partially perfluorinated polymer.

Also, the hydrogen ion conductive polymer electrolyte may be a uniform mixture of 1-99.999 wt % of the hydrogen ion conductive polymer and 0.001-10 wt % of inorganic particles. Herein, the inorganic particles may be made of one or a mixture of two or more selected from the group consisting of $SiO_2$, $TiO_2$, $Al_2O_3$, $ZrO_2$ and $BaTiO_3$.

Figure 3:
FIG. 3 is a photograph of the surface of a reinforced composite electrolyte membrane obtained by impregnating a hydrocarbon-based polymer electrolyte in a ceramic porous substrate.
Figure 4:
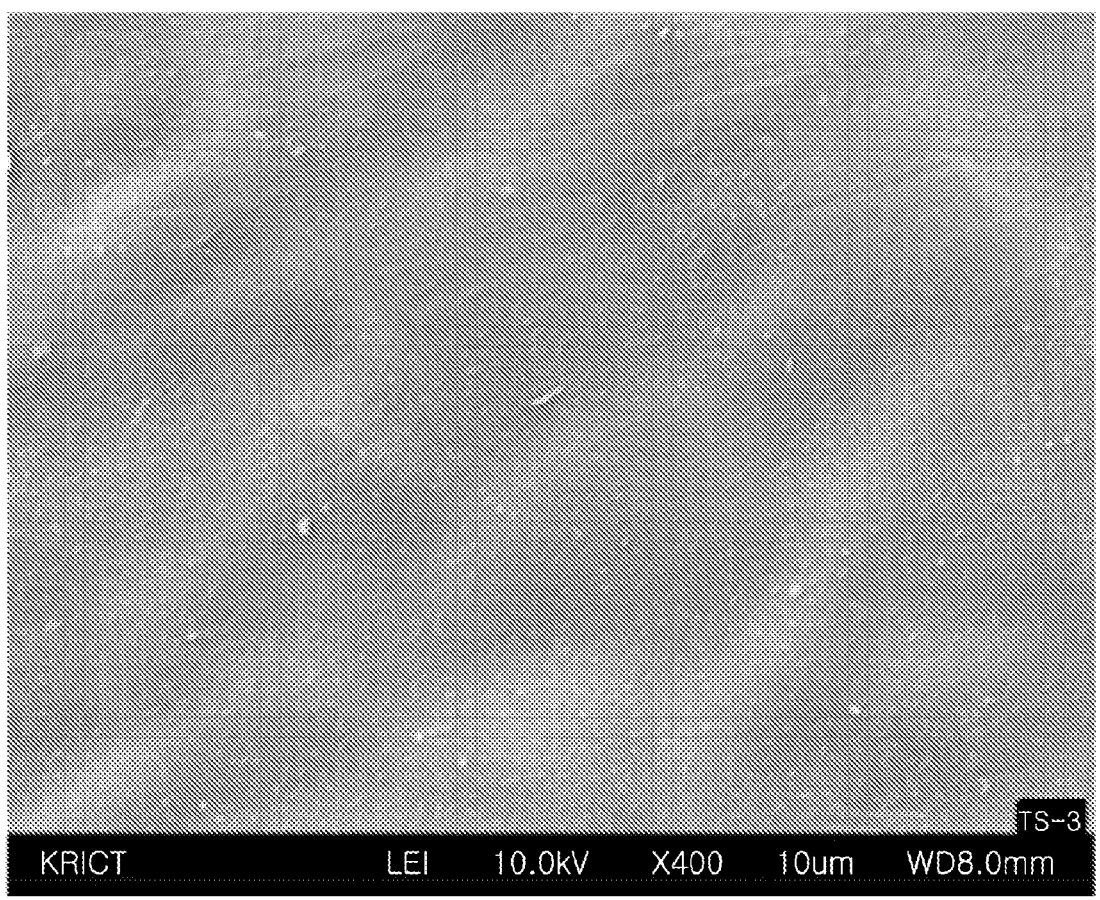
FIG. 4 is a scanning electron micrograph of a reinforced composite electrolyte membrane.
Figure 5:
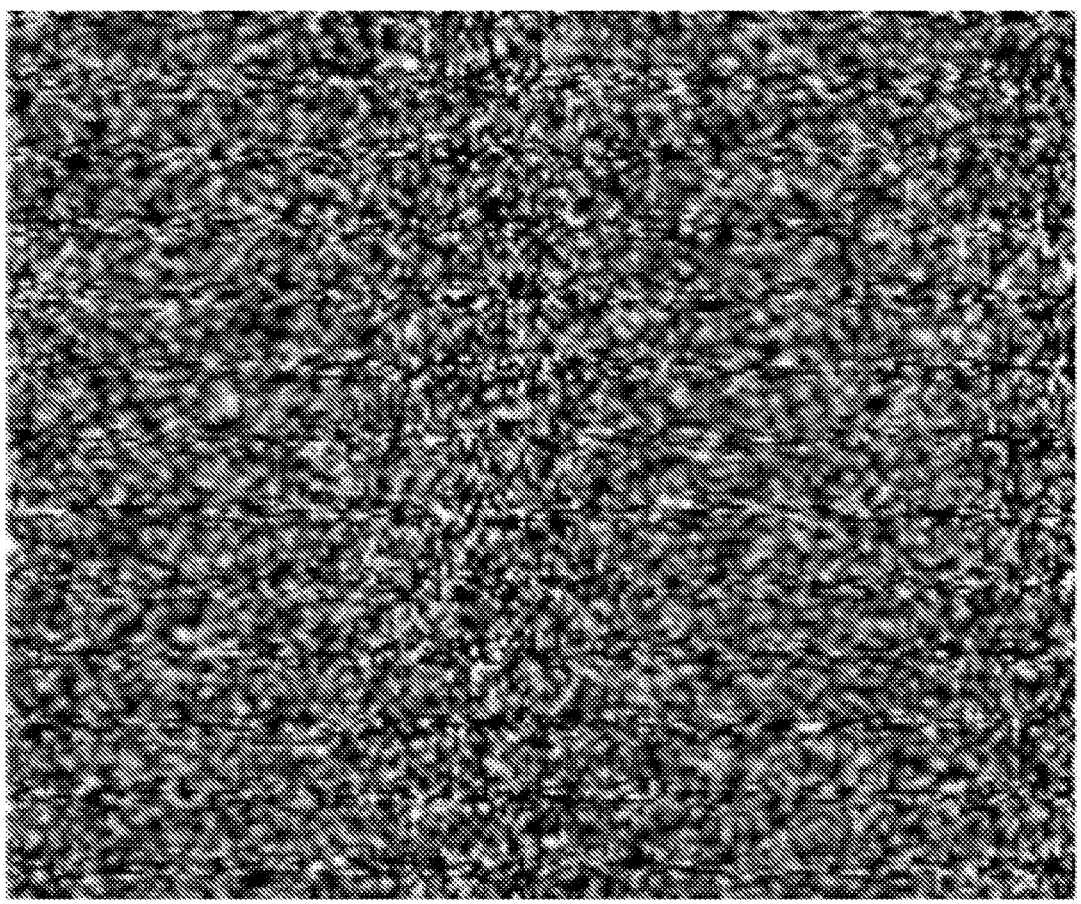
FIG. 5 shows the results of EDS of a reinforced composite electrolyte membrane.

FIGS. 3 to 5 are photographs showing the surface, field effect-scanning electron microscope (FE-SEM) and EDS analysis of the reinforced composite electrolyte membrane according to the present invention, respectively. As can be seen the results of FE-SEM analysis in FIG. 4, the surface of the ceramic porous substrate which showed a void structure has a pore-free compact structure after impregnation with a sulfonated polyarylene ether sulfone (SPAES) copolymer as a hydrogen ion conductive polymer electrolyte. Also, as can be seen from the results of EDS analysis in FIG. 5, sulfur (S) that is the main element of the SPAES copolymer is observed in the membrane, suggesting that the hydrogen ion conductive polymer electrolyte was successfully impregnated into the ceramic porous substrate.

However, in the case of an electrolyte membrane manufactured by impregnating the sulfonated polyarylene ether sulfone (SPAES) copolymer into a PET nonwoven fabric itself without using the ceramic porous substrate (FIG. 6), very severe physical deformation can be observed. Also, in the case of the electrolyte membrane of FIG. 6 manufactured without using the ceramic porous substrate, properties such as ion conductivity and dimensional stability cannot be measured, and thus it can be clearly seen that the reinforced composite electrolyte membrane of the present invention has improved mechanical properties and dimensional stability as a result of introducing the ceramic porous substrate.

Thus, the performance of the reinforced composite electrolyte membrane according to the present invention can be determined according to the chemical structure, pore size, porosity and mechanical properties of the ceramic porous substrate included therein.

Accordingly, the present invention provides a method for manufacturing a reinforced composite electrolyte membrane.

Specifically, the manufacturing method comprises: 1) preparing of the mixture solution containing 10-99 wt % of inorganic nanoparticles and 1-90 wt % of a polymer binder or a silane-based inorganic binder in a solvent;

2) coating a porous polymer base with the mixture solution to prepare a film-shaped ceramic porous substrate, and drying the ceramic porous substrate;

3) impregnating the ceramic porous substrate with a hydrogen ion conductive polymer electrolyte for polymer electrolyte fuel cells or direct methanol fuel cells, and drying the impregnated ceramic porous substrate to prepare a reinforced composite electrolyte membrane.

The manufacturing method of the present invention may further comprise, after step 3), sulfonating the reinforced composite electrolyte membrane using a sulfuric acid solution in order to use the membrane as an electrolyte membrane for polymer electrolyte fuel cells or direct methanol fuel cells.

Hereinafter, each step of the manufacturing method of the present invention will be described in detail.

In the manufacturing method of the present invention, the inorganic nanoparticles that are used in the mixture solution of step 1) may be made of any material having a particle size of 0.001-100 μm. Preferably, the inorganic nanoparticles are made of one or a mixture of two or more selected from the group consisting of $SiO_2$, $TiO_2$, $Al_2O_3$, $ZrO_2$ and $BaTiO_3$.

The polymer binder that is used in the mixture solution of step 1) is preferably made of one or a mixture of two or more selected from the group consisting of polyvinylidene fluoride, polymethylmethacrylate, polyacrylonitrile, polytetrafluoroethylene, polyimide, and styrene-butadiene rubber.

Also, the silane-based inorganic binder that is used in the mixture solution of step 1) may be a silane-based material prepared by a sol-gel reaction. Preferably, the silane-based inorganic binder may be made of one or a mixture of two or more selected from the group consisting of tetraethoxy silane (TEOS), aminopropyltriethoxy silane (AMEO), glycidyloxytrimethoxy silane (GLYMO), and vinyltriethoxy silane (VTEO).

Also, the solvent that is used in the mixture solution of step 1) may be any solvent in which the binder can be dissolved. Preferably, the binder is one or a mixture of two or more selected from the group consisting of water, alcohol, acetone, ether, tetrahydrofuran, cyclohexane, carbon tetrachloride, chloroform, methylene chloride, dimethyl formamide, dimethylacetamide, and N-methylpyrrolidone.

It will be obvious to a person skilled in the art that the ceramic porous substrate according to the second embodiment of the present invention can be prepared by preparing a solution containing the silane-based inorganic binder alone without the inorganic nanoparticles in step 1 and performing the subsequent steps.

The porous polymer base that is used in step 2) of the manufacturing method of the present invention is in the form of a membrane, a woven fabric, a nonwoven fabric or the like. Herein, the porous polymer base is made of a material having a pore size of 0.001-100 μm and a thickness of 1-1,000 μm.

The porous polymer base is preferably made of one or a mixture of two or more selected from the group consisting of polyethylene, polypropylene, polyester, polyamide, cellulose, polysulfone, polyethersulfone, and polyimide.

In step 2), coating the porous polymer base with the mixture solution containing the inorganic nanoparticles and the polymer binder or the silane-based inorganic binder may be carried out using, but not limited to, a dip coating method or a cast coating method.

In step 3) of the manufacturing method according to the present invention, the hydrogen ion conductive polymer electrolyte that is impregnated in the ceramic porous substrate may be any electrolyte that is used for polymer electrolyte fuel cells or direct methanol fuel cells. Typical examples thereof include those containing a perfluorinated polymer, a hydrocarbon-based polymer, or a partially fluorinated polymer. Also, the electrolyte may be made of a uniform mixture of 1-99.999 wt % of the hydrogen ion conductive polymer and 0.001-10 wt % of inorganic particles, in which the inorganic particles may be made of one or a mixture of two or more selected from the group consisting of $SiO_2$, $TiO_2$, $Al_2O_3$, $ZrO_2$ and $BaTiO_3$.

The reinforced composite electrolyte membrane manufactured according to the method of the present invention preferably has the smallest possible thickness so as to provide advantages in terms of ion conductivity. Specifically, the thickness of the reinforced composite electrolyte membrane is preferably 0.1-1000 μm, and more preferably 1-300 μm.

The reinforced composite electrolyte membrane manufactured according to the method of the present invention shows excellent mechanical strength and low water uptake rate. Particularly, the membrane of the present invention shows a change in area of 10% or less between before and after impregnation with water at a temperature of 25° C. or above, suggesting that it has excellent dimensional stability.

Further, the present invention provides a membrane-electrode assembly comprising said reinforced composite electrolyte membrane as an electrolyte membrane for polymer electrolyte fuel cells or direct methanol fuel cells.

The reinforced composite electrolyte membrane according to the present invention has excellent transport properties, such as high hydrogen ion conductivity and methanol crossover, low water uptake rate at high temperature, and high dimensional stability, which are required for fuel cell membranes. Thus, a membrane-electrode assembly comprising the reinforced composite electrolyte membrane of the present invention will have improved performance.

Furthermore, a polymer electrolyte fuel cell or a direct methanol fuel cell, which comprises the membrane-electrode assembly of the present invention, will have improved performance.

Mode for Invention

Hereinafter, the present invention will be described in further detail with reference to examples. It is to be understood, however, that these examples are for illustrative purposes only and are not intended to limit the scope of the present invention.

Example 1

Step 1

Preparation of Ceramic Porous Substrate Consisting of Silica Nanoparticles and SBR Silica ($SiO_2$) nanoparticles, having an average particle size of about 530 nm, and tetraethoxysilane (TEOS) are mixed at a weight ratio of 85:15 and dispersed in an ethyl alcohol solvent by bead milling for 2 hours, thereby preparing a mixture solution.

Meanwhile, a polyethylene terephthalate (PET) nonwoven fabric having a thickness of 20 µm was selected as a porous polymer base.

The PET nonwoven fabric was immersed in the above-prepared mixture solution, and then dried at 80° C. for 6 hours, thereby preparing a ceramic porous substrate comprising the silica nanoparticles bound thereto by the inorganic silane-based binder.

Step 2

Preparation of a Sulfonated Polyarylene Ether Sulfone Copolymer Having a Sulfonation Degree of about 50%

A 100-ml round-bottom flask equipped with a gas inlet, a thermometer, a Dean-Stark trap, a cooler and a stirrer was purged with nitrogen for several minutes to remove air and impurities. Then, 3.4460 g of 4,4'-dichlorodiphenylsulfone, 3.7242 g of 4,4'-biphenol (hereinafter referred to as "BP"), 3.9301 g of disulfonated dichlorodiphenylsulfone, 3.1787 g of $K_2CO_3$, 44.4 ml of NMP and 22.2 ml of toluene (NMP/toluene=2/1 v/v) were charged into the flask and stirred at 80° C. or higher for 1 hour or more while the monomers were dissolved.

Then, the reaction solution was heated to 160° C. and refluxed with toluene for 4 hours to remove water. Then, the reaction solution was heated to 190° C. to completely remove the remaining toluene through the Dean-Stark trap, and was allowed to react for 24 hours. After completion of the reaction, the reaction solution was diluted with NMP, filtered, and then poured in water to form a swollen fiber-type to precipitate and then filtered. Then, the resulting reaction product was dried in a vacuum drier at 120° C. for 24 hours, thereby obtaining a sulfonated polyarylene ether sulfone copolymer.

Step 3

Manufacture of Reinforced Composite Electrolyte Membrane

The above-prepared sulfonated polyarylene ether sulfone (SPAES) copolymer having a degree of sulfonation of about 50% was dissolved in dimethylacetamide (DMAc) at 40° C. The solution was impregnated into the ceramic porous substrate, prepared in step 1 above, by a casting process, followed by drying, thereby manufacturing a reinforced composite electrolyte membrane having a thickness of about 30 µm.

Example 2

Step 1

Preparation of Ceramic Porous Substrate by Sol-Gel Reaction of TEOS

TEOS and 0.1N nitric acid ($HNO_3$) were mixed at a weight ratio of 60:40 and treated using an ethyl alcohol solvent in the same manner as Example 1, thereby preparing a mixture solution. Meanwhile, a polyethylene terephthalate (PET) nonwoven fabric having a thickness of 20 µm was selected as a porous polymer base.

Then, the PET nonwoven fabric was immersed in the above-prepared mixture solution for 5 minutes, and then dried at 80° C. and 120° C. for 4 hours for each temperature, thereby performing a sol-gel reaction of TEOS, thereby preparing a porous substrate having a silicate ceramic layer formed thereon. After the ceramic coating process, the thickness of the substrate was maintained at 20 µm, suggesting that the silicate ceramic layer formed from TEOS was formed in the pores of the nonwoven fabric.

Example 3

The process of Example 1 was repeated, except that silica panoparticles were used as the ceramic layer component in step and mixed with a styrene-butadiene rubber (SBR) binder to prepare a mixture solution, thereby manufacturing a reinforced composite electrolyte membrane.

Example 4

The process of Example 1 was repeated, except that the ceramic porous substrate prepared in step 1 of Example 1 was impregnated with a Nafion solution (5 wt % solids content) in place of the sulfonated polyarylene ether sulfone (SPAES) copolymer prepared in step 2 by a casting process, followed by drying, thereby manufacturing a reinforced composite electrolyte membrane having a thickness of about 30 µm.

Comparative Example 1

In Comparative Example 1, the preparation of the ceramic porous substrate in step 1 of Example 1 and impregnation with the sulfonated polyarylene ether sulfone (SPAES) copolymer in step 3 of Example 1 were not carried out. Specifically, the sulfonated polyarylene ether sulfone (SPAES) copolymer prepared in step 2 of Example 1 was dissolved in dimethylacetamide (DMAc) as a solvent and cast onto a Teflon sheet, followed by drying, thereby manufacturing an electrolyte membrane.

Comparative Example 2

The process of Example 1 was repeated, except that a polyethylene terephthalate (PET) nonwoven fabric alone was used in step 1 of Example 1 to prepare a porous substrate without forming the ceramic layer, thereby manufacturing a reinforced composite electrolyte membrane.

Test Example 1

Evaluation of Physical Properties

1. Analysis of Structures of Porous Substrate and Reinforced Composite Membrane

FIG. 1 is a field effect-scanning electron micrograph (FE-SEM) of the polyethylene terephthalate (PET) nonwoven fabric used as the porous base in Example 1, and FIG. 2 is a field effect-scanning electron micrograph (FE-SEM) of the ceramic porous substrate prepared by introducing the mixture of the silica nanoparticles and the TEOS binder into the PET nonwoven fabric. As can be seen in FIGS. 1 and 2, in the ceramic porous substrate of the present invention, the silica nanoparticles were easily bound to the nonwoven fabric by the TEOS binder so that the ceramic porous layer was formed in the nonwoven fabric.

FIGS. 3 to 5 are photographs showing the surface, field effect-scanning electron microscope (FE-SEM) and EDS analysis of the reinforced composite electrolyte membrane wherein hydrocarbon-based polymer electrolyte, sulfonated polyarylene ether silfone (SPAES) was impregnated to ceramic porous substrate according to the present invention, respectively.

As can be seen the results of FE-SEM analysis in FIG. 4, the surface of the ceramic porous substrate which showed a void structure before impregnation had a pore-free compact structure after impregnation with a sulfonated polyarylene ether sulfone (SPAES) copolymer.

Also, as can be seen from the results of EDS analysis in FIG. 5, sulfur (S) that is the main element of the SPAES copolymer was observed in the membrane.

2. Analysis of Physical Properties of Porous Substrate and Reinforced Composite Membrane The porosities and air permeabilities of the ceramic porous substrates and reinforced composite electrolyte membranes prepared in Examples 1 to 4 were measured, and the results of the measurement are shown in Table 1 below. Herein, the air permeability indicating the void structure of the porous substrates was measured using a gurley densometer.

TABLE 1

Results of measurement of porosity and air permeability

| Object | Test item | Example 1 | Example 2 | Example 3 | Example 4 |
|---|---|---|---|---|---|
| Ceramic porous substrate (before impregnation with SPAES) | Porosity (%) | 70 | 68 | 69 | 70 |
|  | Air permeability (sec/100 cc) | 0 | 0 | 0 | 0 |
| Reinforced composite electrolyte membrane (after impregnation with SPAES) | Porosity (%) | 3 | 2 | 4 | 3 |
|  | Air permeability (sec/100 cc) | Infinite | Infinite | Infinite | Infinite |

As can be seen from the results in Table 1 above, the porosity was decreased due to the ceramic layer formed in the porous substrate, but the air permeability did not change, suggesting that the ceramic layer does not influence the migration of hydrogen ions.

Also, the porosity after impregnation with the sulfonated polyarylene ether sulfone (SPAES) copolymer was 5% or less, suggesting that most pores of the ceramic porous substrate were impregnated. Also, the air permeability of the electrolyte membrane was infinite, suggesting that the substrate was successfully impregnated with the SPAES copolymer.

From the above results of observation of the morphology by field effect-scanning electron microscopy (FE-SEM) and measurement of the air permeability, it was found that the nanoparticles were successfully bound to the polyethylene terephthalate (PET) nonwoven fabric.

Figure 6:
FIG. 6 is shows the surface of a reinforced composite electrolyte membrane manufactured in Comparative Example 2 of the present invention.

FIG. 6 shows the surface of the reinforced composite electrolyte membrane which was prepared in Comparative Example 2 by impregnating the sulfonated polyarylene ether sulfone (SPAES) copolymer into the polyethylene terephthalate (PET) nonwoven fabric without introducing the ceramic layer. As can be seen in FIG. 6, severe physical deformation was observed.

Test Example 2

Evaluation of Characteristics of Fuel Cell Membrane

1. Measurement of Water Uptake Rate

In order to measure the water uptake rates of the reinforced composite electrolyte membranes prepared in Examples 1 to 4 and Comparative Example 1, each of the composite electrolyte membranes was washed several times with deionized water and immersed in deionized water for 24 hours. Then, water was removed from the surface of each membrane, after which the weight of each membrane was measured ($W_{wet}$). Then, each membrane was dried in a vacuum dryer at 120° C. for 24 hours, after which the weight thereof was measured ($W_{dry}$). The water uptake rate of each membrane was calculated according to the following equation 1:

$$\text{Water uptake (\%)} = W_{wet} - W_{dry}/W_{dry} \times 100 \qquad \text{[Equation 1]}$$

2. Measurement of Dimensional Stability

The dimensional stability of each membrane was measured in the same manner as the measurement of water uptake rate as described above, except that a change in the area of each membrane was measured instead of measuring the weight. Based on the measurement results, the dimensional change (%) of each membrane was calculated according to the following equation 2:

$$\text{Dimensional change (\%)} = \text{membrane area (wet)} - \text{membrane area (dry)/membrane area (dry)} \times 100 \qquad \text{[Equation 2]}$$

3. Measurement of Ion Conductivity

The ion conductivity of each of the reinforced composite electrolyte membranes prepared in Examples 1 to 4 and Comparative Example 1 was measured using a Solatron-1280 Impedance/Gain-Phase analyzer at 25° C. Herein, impedance spectrum was recorded in the frequency range from 10 MHz to 10 Hz, and the ion conductivity of each membrane was calculated according to the following equation 3:

$$\text{Ion conductivity } (S/cm) = \delta = 1/R \times L/A \qquad \text{[Equation 3]}$$

wherein R is measured resistance ($\Omega$), L is a distance (cm) between electrodes, and A is the cross-sectional area ($cm^2$) of the electrolyte membrane.

The results of evaluation of the properties of the fuel cell membranes as described above are shown in Table 2 below.

TABLE 2

Results of evaluation of properties of fuel cell membranes

|  | Example 1 | Example 2 | Example 3 | Example 4 | Comparative Example 1 |
|---|---|---|---|---|---|
| Water uptake (%) | 60 | 55 | 52 | 43 | 127 |
| Dimensional stability (%) | 0 | 0 | 0 | 0 | 130 |
| Ion conductivity (S/cm) | 0.08 | 0.07 | 0.06 | 0.07 | 0.13 |

TABLE 2-continued

Results of evaluation of properties of fuel cell membranes

|  | Example 1 | Example 2 | Example 3 | Example 4 | Comparative Example 1 |
|---|---|---|---|---|---|
| Membrane thickness (μm) | 30 | 30 | 30 | 30 | 105 |

As can be seen in Table 2 above, the water uptake rate of the reinforced composite electrolyte membranes manufactured from the ceramic porous substrate of the present invention was reduced by about 50% compared to the electrolyte membrane manufactured from the sulfonated polyarylene ether sulfone (SPAES) copolymer alone. Such results suggest that the ceramic porous substrate of the present invention contributed to reducing the water uptake rate of the electrolyte membrane.

Also, when the dimensional stability of the electrolyte membrane, which is important in membrane-electrode assemblies, was measured as described above, there was little or no in the dimension of the reinforced composite electrolyte membrane of the present invention, suggesting that the dimensional stability of the reinforced composite electrolyte membrane of the present invention was significantly improved compared to the sulfonated polyarylene ether sulfone (SPAES) copolymer alone. This result is considered as the most remarkable improvement of the reinforced composite electrolyte membrane of the present invention.

When the hydrogen ion conductivity and resistance of the reinforced composite electrolyte membrane manufactured from the ceramic porous substrate of the present invention were compared with those of the electrolyte membrane manufactured from the sulfonated polyarylene ether sulfone (SPAES) copolymer alone, the hydrogen ion conductivity of the electrolyte membrane of the present invention was reduced compared to that the membrane manufactured from the sulfonated polyarylene ether sulfone (SPAES) copolymer alone due to the ceramic porous substrate having no hydrogen ion conductivity. However, when the membrane thickness is considered, the thickness of the membrane of the present invention can be significantly reduced because it has high mechanical strength, suggesting that the hydrogen ion conductivity of the membrane of the present invention can be controlled to a level equal to or higher than that of the membrane manufactured from the sulfonated polyarylene ether sulfone (SPAES) copolymer alone. Such results indicate that, when the reinforced composite electrolyte membrane is applied to a membrane-electrode assembly, the membrane-electrode assembly will show significantly improved properties compared to a membrane-electrode assembly comprising a membrane manufactured from the sulfonated polyarylene ether sulfone (SPAES) copolymer alone.

INDUSTRIAL APPLICABILITY

As described above, according to the present invention, the silane-based inorganic binder alone or a combination of inorganic nanoparticles and the binder is introduced onto the porous polymer base to prepare the ceramic porous substrate, whereby the ceramic porous substrate has improved mechanical properties compared to the porous polymer base alone, and the pore size, porosity and void structure of the ceramic porous substrate are improved. Thus, the ceramic porous substrate of the present invention is a new conceptual substrate for fuel cell electrolyte membranes.

Also, a hydrogen ion conductive polymer electrolyte such as sulfonated polyarylene ether sulfone or Nafion is impregnated in the ceramic porous substrate to prepare a reinforced composite electrolyte membrane, whereby the mechanical properties and dimensional stability of the electrolyte membrane can be improved, and the ion conductivity thereof can be optimized by controlling the void structure of the substrate.

In addition, the reinforced composite electrolyte membrane is applied to an electrolyte membrane for polymer electrolyte fuel cells or direct methanol fuel cells, thereby providing a membrane-electrode assembly having improved performance.

Although the preferred embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A reinforced composite electrolyte membrane comprising:
   a polymer-ceramic porous substrate comprising:
      a porous polymer base; and
      void structures formed on a surface of the porous polymer base by linking spaces of inorganic nanoparticles using a polymer binder or a silane-based inorganic binder; and
   wherein a hydrogen ion conductive polymer electrolyte for polymer electrolyte fuel cells or direct methanol fuel cells is impregnated in the void structures;
   wherein the hydrogen ion conductive polymer electrolyte is a uniform mixture of 1-99.999 wt % of a hydrogen ion conductive polymer and 0.001-10 wt % of one or a mixture of two or more selected from the group consisting of $SiO_2$, $TiO_2$, $Al_2O_3$, $ZrO_2$ and $BaTiO_3$.

2. The reinforced composite electrolyte membrane of claim 1, wherein the reinforced composite electrolyte membrane shows a change in area of 10% or less between before and after impregnation with water at a temperature of 25° C. or above.

3. A membrane-electrode assembly comprising the reinforced composite electrolyte membrane of claim 1 as an electrolyte membrane for polymer electrolyte fuel cells or direct methanol fuel cells.

* * * * *